UNITED STATES PATENT OFFICE.

GEORG BREDIG, OF KARLSRUHE, GERMANY, ASSIGNOR TO FIRM OF RUDOLPH KOEPP & CO., OF OESTRICH-ON-THE-RHINE, GERMANY, (A GERMAN SOCIETY.)

PROCESS OF MAKING FORMATES.

1,204,933. Specification of Letters Patent. Patented Nov. 14, 1916.

No Drawing. Application filed December 4, 1914. Serial No. 875,466.

*To all whom it may concern:*

Be it known that I, GEORG BREDIG, a subject of the German Emperor, and resident of Karlsruhe, Baden, Germany, have invented certain new and useful Improvements in the Process of Making Formates, of which the following is a specification.

My invention relates to a process of obtaining formic acid compounds from carbonic acid or its compounds by reduction.

I am aware that it is old to obtain formates by subjecting bicarbonates to the reducing action of hydrogen *in statu nascendi* under ordinary pressure, but such processes requiring the use of hydrogen *in statu nascendi* are seldom practicable on a manufacturing scale. In contradistinction to this old method I use ordinary hydrogen and I allow it to act upon a $CO_2$-containing substance such as carbon dioxid, carbonic acid or a carbonic acid salt in the presence of a catalyst, a high pressure being maintained during the reaction. If carbon dioxid itself is used, some substance capable of combining formic acid should be present, such as a salt of a difficultly soluble acid or of an acid which is weaker than formic acid.

The possibility of obtaining formic acid from carbonic acid by aid of ordinary hydrogen was the more improbable for the reason that others had previously worked along these lines, but had failed to get any satisfactory results. M. Kleinstück (*Zeitschrift für angewandte Chemie* 23 (1910) page 1106) treated bicarbonate of alkali in the presence of palladium alumina with hydrogen gas under ordinary pressure and thought, it is true, that he produced formic acid. However, the quantities developed in the circumstances stated by him were obviously so small as to prevent him from determining with certainty whether, in fact, formic acid or formaldehyde was obtained. He speaks of "formic acid" or "formaldehyde," but all he was able to prove with the aid of ammoniacal silver solution was the "presence of reducing agents."

According to my invention, however, formates are obtained on a commercial scale by causing ordinary hydrogen to act, under a pressure substantially greater than atmospheric pressure and in presence of catalytic agents, upon carbonic acid, either in its gaseous state or in the form of a bicarbonate. If carbonic acid gas is used, a substance capable of binding the formic acid forming should be present. Instead of the ordinary carbonic acid gas, which can be obtained nowadays at a low price, a mixture of carbonic acid gas with other gases, such as for instance hydrogen, may be used.

Example I: 200 ccm. of a 5 per cent. solution of bicarbonate of potash and 1.5 g. palladium-black are stirred vigorously with hydrogen gas at a temperature of 70 degr. C. and a pressure of 60 atmospheres. 75 per cent. of the bicarbonate present is converted into formate.

Example II: Carbonate of calcium is subjected at 70 degr. C. in the presence of water and palladium-black to the simultaneous action of carbonic acid gas of 20 atmospheres and hydrogen gas of 50 atmospheres. Within a few hours' vigorous stirring the carbonate is transformed into formate.

Example III: 200 ccm. of a 5 per cent. solution of borax and 1.5 g. palladium-black are subjected at 70 degr. C. to the simultaneous action of hydrogen gas of 30 atmospheres and carbonic acid gas of 30 atmospheres. After eight hours' stirring about 20 per cent. of the borax is converted into formate.

I claim:

1. The process of making formates which comprises treating a $CO_2$-containing substance with ordinary hydrogen gas under a pressure substantially greater than atmospheric pressure in the presence of a catalyst.

2. The process of making formates which comprises treating carbon dioxid and a substance capable of binding formic acid with ordinary hydrogen gas under a pressure substantially greater than atmospheric pressure in the presence of water and a catalyst.

3. The process of making formates which comprises treating carbon dioxid and a salt of an acid which is weaker than formic acid with ordinary hydrogen gas under a pressure substantially greater than atmospheric pressure in the presence of water and a catalyst.

4. The process of making formates which comprises treating carbon dioxid and a carbonate with ordinary hydrogen gas under a pressure substantially greater than atmospheric pressure in the presence of water and a catalyst.

5. The process of making formates which comprises treating a substance capable during the reaction of yielding both carbon dioxid and a compound capable of binding formic acid, with ordinary hydrogen gas under a pressure substantially greater than atmospheric pressure in the presence of water and a catalyst.

6. The process of making formates which comprises treating a bicarbonate with ordinary hydrogen gas under a pressure substantially greater than atmospheric pressure in the presence of water and a catalyst.

7. The process of making formates which comprises treating a $CO_2$-containing substance with ordinary hydrogen gas under a pressure substantially greater than atmospheric pressure in the presence of a catalytic metal of the platinum group.

8. The process of making formates which comprises treating carbon dioxid and a salt of an acid which is weaker than formic acid with ordinary hydrogen gas under a pressure substantially greater than atmospheric pressure in the presence of water and palladium black.

9. The process of making formates which comprises treating a $CO_2$-containing substance with ordinary hydrogen gas under a pressure of from 30 to 60 atmospheres in the presence of a catalyst.

10. The process of making formates which comprises treating carbon dioxid and a substance capable of binding formic acid with ordinary hydrogen gas under a pressure of from 30 to 60 atmospheres in the presence of water and a catalyst.

11. The process of making formates which comprises treating a $CO_2$-containing substance with ordinary hydrogen gas under a pressure of from 30 to 60 atmospheres in the presence of a catalytic metal of the platinum group.

12. The process of making formates which comprises treating carbon dioxid and a substance capable of binding formic acid with ordinary hydrogen gas under a pressure of from 30 to 60 atmospheres in the presence of water and a catalytic metal of the platinum group.

13. The process of making formates which comprises treating a bicarbonate with ordinary hydrogen gas under a pressure of more than thirty atmospheres in the presence of water and a catalyst.

14. The process of making formates which comprises treating at a temperature of about 70° C. a $CO_2$-containing substance with ordinary hydrogen gas under a pressure substantially greater than atmospheric pressure in the presence of a catalyst.

15. The process of making formates which comprises treating at a temperature of about 70° C. carbon dioxid and a salt of an acid which is weaker than formic acid with ordinary hydrogen gas under a pressure substantially greater than atmospheric pressure in the presence of water and a catalyst.

16. The process of making formates which comprises treating at a temperature of about 70° C. a $CO_2$-containing substance with ordinary hydrogen gas under a pressure of from 30 to 60 atmospheres in the presence of a catalyst.

17. The process of making formates which comprises treating at a temperature of about 70° C. carbon dioxid and a substance capable of binding formic acid with ordinary hydrogen gas under a pressure of from 30 to 60 atmospheres in the presence of water and a metal of the platinum group.

In testimony whereof I have signed my name to this specification in the presence of two subscribing witnesses.

GEORG BREDIG.

Witnesses:
H. MERLE COCHRAN,
MATHILDE NARRAWAY.